Dec. 20, 1966           S. SMITH           3,292,757
SUPPORT BRACKET FOR MOTOR-CLUTCH ASSEMBLY
Original Filed July 2, 1963           2 Sheets-Sheet 1
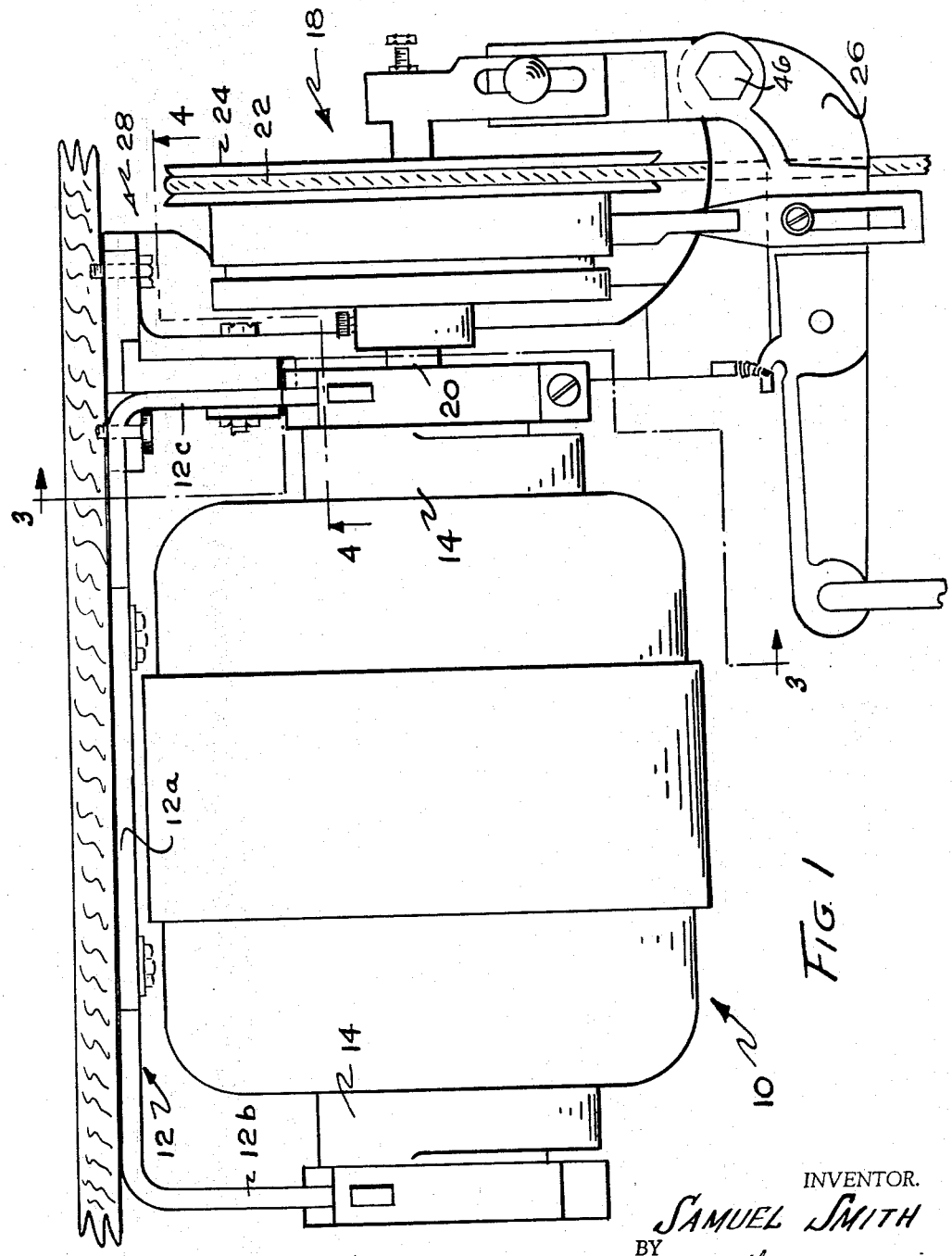
INVENTOR.
SAMUEL SMITH
BY
Patterson Wright & Patterson
ATTORNEYS

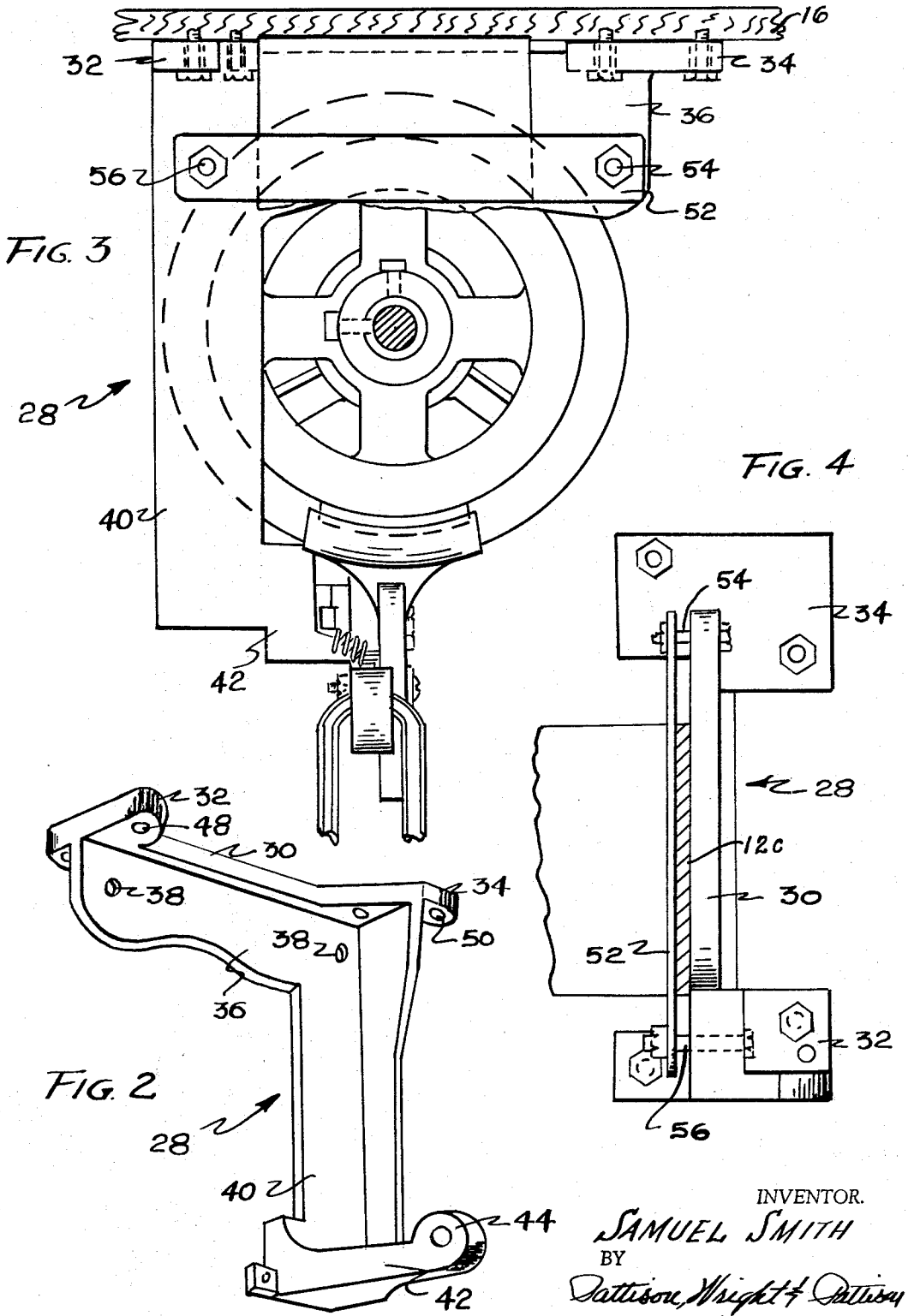

United States Patent Office 3,292,757
Patented Dec. 20, 1966

3,292,757
SUPPORT BRACKET FOR MOTOR-CLUTCH ASSEMBLY
Samuel Smith, 555 8th Ave., Flushing, N.Y. 10018
Original application July 2, 1963, Ser. No. 295,867, now Patent No. 3,240,301, dated Mar. 15, 1966. Divided and this application Jan. 13, 1966, Ser. No. 520,473
3 Claims. (Cl. 192—112)

This application is a division of application Serial No. 295,867, filed July 2, 1963, now Pat. No. 3,240,301 which was a continuation-in-part of application Serial No. 64,595, filed October 24, 1960 now abandoned.

The invention herein disclosed and claimed relates to a novel and useful support bracket adapted to secure a friction clutch assembly to an electric motor.

The prior art demonstrates that heretofore friction clutch and brake assemblies have been cooperatively adapted to electric motors to power sewing machines, particularly sewing machines of heavy commercial and industrial application. Heretofore friction clutch assemblies for sewing machine motors have been supported from the typical motor base thereby inherently limiting the ready adjustability of the clutch assembly relative to the motor.

It is a primary object of the present invention to provide a unique bracket for securing a friction clutch to an electric motor which is supported from the end bonnet of the motor thereby eliminating the need for a motor base which would otherwise have no application or use in a typical sewing machine motor assembly.

Another object of this invention resides in the provision of a unique mounting bracket for attachment of a friction clutch to a sewing machine motor under the usual conditions where the motor is located and supported beneath a table or bench surface on which the sewing machine is supported.

Still another object of this invention rests in providing a mounting bracket for securing a friction clutch assembly to an electric motor wherein the clutch is quickly and easily attached, adjusted or removed or in respect to the electric motor.

Still further objects and advantages of the present invention lie in the provision of a simple and inexpensive bracket of the type described which is durable and long-lasting in use.

Additional objects and advantages of the present invention will become more readily apparent to those skilled in the art when the following general statement and description are read in the light of the appended drawings.

The nature of the present invention, in general terms, relates to a bracket adapted to mount a friction clutch-brake assembly on an electric drive motor of the type used to power a sewing machine and includes a generally L-shaped bracket removably and adjustably secured to one end of an electric motor and presenting adjacent to the lower extremity thereof a perpendicularly, horizontally extending foot element, means for adjusting the position of said bracket horizontally and vertically relative to said motor, and means on the extended foot element of said bracket for pivotally securing thereto the main supporting lever arm of a friction brake assembly associated with the extended driven shaft of said motor.

With reference to the accompanying drawings in which like numerals designate similar parts throughout the several views:

FIG. 1 is a perspective view of the bracket constituting the inventive concept hereof;

FIG. 2 is a side elevation in partial section of the bracket in motor-clutch assembly position;

FIG. 3 is a vertical section taken on line 3—3, FIG. 1;

FIG. 4 is a horizontal section taken on line 4—4, FIG. 1.

In the accompanying drawings in which is illustrated an operative embodiment of the present invention, 10 generally designates a typical small horsepower motor of the type utilized to drive a commercial sewing machine, 12 indicates a typical bridge-type suspension base for said motor, including an elongated base extension 12a and perpendicular end leg portions 12b and 12c, secured between the end bonnets 14 of the motor and adapted to be fastened to the underside of a work table 16 beneath which the motor is suspended. The numeral 18 generally designates a friction clutch-brake assembly associated with the driven shaft 20 of the motor extending outwardly from one end bonnet thereof, said friction clutch-brake assembly including a belt pulley 22 engaged upon a sheave 24 in said assembly and extending vertically through apertures provided in said table to engage with the driven element of a sewing machine secured to the upper surface of the table. The clutch-brake assembly further includes a bell crank type lever 26 operable to engage and disengage the clutch brake device in respect to the driven motor shaft.

The supporting bracket constituting the present invention, generally designated 28 is formed by an elongated narrow plate section 30 defined between large end flanges 32 and 34. A flanged leg element 36 is formed perpendicularly to and longitudinally of said plate section 30 and is provided with bolt holes 38 at each end thereof. A second elongated leg element 40 is formed as a perpendicular extension from one end of the leg element 36. The projected end of the second leg element 40 is provided with a perpendicular extending foot 42 which lies in a plane perpendicular to the longitudinal centerline of the plate section. The extreme end of the foot 42 is provided with an enlarged transversely drilled boss 44 to which the bell crank 26 of the clutch-brake assembly is pivotally connected as at 46 centrally of the bell crank.

Each of the two flange portions 32 and 34 has two spaced holes 48 and 50, each hole being adapted to accommodate a screw or bolt by means of which the entire bracket may be secured to the underside of the work table. The bracket is adjustably secured to the suspension base of the motor by means of an elongated clamp plate 52 which is positioned on the motor side of one end leg (12c) of the motor suspension base while the bracket 28 is positioned on the opposite side of leg 12c and secured beyond the transverse extremities of the suspension base leg to the clamp plate by threaded fasteners 54 and 56 thereby permitting the vertical and horizontal adjustment of the bracket relative to the vertical leg 12c of the motor suspension base above that end bonnet from which the driven shaft of the motor projects.

By the vertical and horizontal adjustment of the bracket 28 relative to the motor suspension base, the positioning of the bell crank 26 for operation of the clutch-brake assembly may be adjusted in respect to the axis of the driven shaft of the motor and said bell crank may be firmly secured in place to permit minor adjustments in the components of the clutch-brake assembly in conventional manner.

From the foregoing it is readily seen that a supporting bracket is provided for quickly and easily attaching and detaching a clutch-brake assembly relative to a motor substantially permanently fixed to the underside of a work surface and which permits quick and easy adjustment both vertically and horizontally of the clutch-brake assembly relative to the driven shaft of the motor.

Having thus described and explained my invention in terms of an operable embodiment thereof what I desire to claim is:

1. In combination with a motor base having a leg engaging an end bonnet of the motor and a friction clutch operably associated with the motor shaft extending from the end bonnet, a support bracket for securing the clutch in operable relationship to the motor shaft comprising, an elongated body section, a perpendicular foot on one end of said body section pivotally supporting the clutch, transversely spaced clamp bolts supported by the second end of said body section, and a clamp plate engageable behind the bonnet engaged leg of said motor base cooperating with said clamp bolts to adjustably position and lock said bracket on said motor base.

2. A combination as defined in claim 1 wherein said elongated body section is provided at that end remote to said clutch support with a transversely extending head section offset to one side of the longitudinal axis of said body section, and said clamp bolts are supported by the remote ends of said head section.

3. A combination as defined in claim 1 wherein the elongated body section of said bracket is of inverted L-shaped configuration in front elevation, the extreme ends of the transverse portion of said body support the clamp bolts cooperating with said clamp plate, said foot projects perpendicularly from the lower face of said body section, and the upper edge of said body section is perpendicularly flanged to provide means to securely suspend said bracket from beneath a horizontal platform.

References Cited by the Examiner
UNITED STATES PATENTS

| | | | |
|---|---|---|---|
| 2,068,331 | 1/1937 | Katzman | 192—17 |
| 2,167,450 | 7/1939 | Ginsburg | 192—17 X |
| 2,493,894 | 1/1950 | Minkowitz | 192—17 |
| 2,874,815 | 2/1959 | Hoffman | 192—115 X |

DAVID J. WILLIAMOWSKY, *Primary Examiner.*

A. T. McKEON, *Assistant Examiner.*